United States Patent [19]

Trissel et al.

[11] Patent Number: 5,274,815
[45] Date of Patent: Dec. 28, 1993

[54] DYNAMIC INSTRUCTION MODIFYING CONTROLLER AND OPERATION METHOD

[75] Inventors: David W. Trissel; Steven R. Menyhert, both of Austin, Tex.

[73] Assignee: Motorola, Inc., Schaumburg, Ill.

[21] Appl. No.: 786,628

[22] Filed: Nov. 1, 1991

[51] Int. Cl.⁵ .............................................. G06F 9/40
[52] U.S. Cl. ...................... 395/700; 364/DIG. 1; 364/261.1; 364/261.5; 364/280
[58] Field of Search ............... 395/602, 650, 200, 500, 395/375, 275, 725, 800; 364/DIG. 1 MS File

[56] References Cited

U.S. PATENT DOCUMENTS

| | | | |
|---|---|---|---|
| 4,109,311 | 8/1978 | Blum et al. | 395/375 |
| 4,454,579 | 6/1984 | Pilat et al. | 364/DIG. 1 |
| 4,847,517 | 7/1989 | Nakade et al. | 395/650 |
| 5,133,063 | 7/1992 | Naito et al. | 395/500 |
| 5,168,566 | 12/1992 | Kuki et al. | 395/650 |

*Primary Examiner*—Thomas M. Heckler
*Attorney, Agent, or Firm*—Keith E. Witek

[57] ABSTRACT

A dynamic instruction modifying controller (10, 11, or 13) and controller method of operation for use with a general purpose computer. The controller has an execution device (12) and a memory (14). Residing in memory (14) is a control program (16). Control program (16) communicates to the execution device via a conductor (22). A target program (18) resides in memory (14) and communicates with the control program (16) via a conductor (24). A modifying program (20) resides in memory (14) and communicates to the control program (16) via a conductor (28). The modifying program (20) alters the target program (18) during target program (18) execution time to include the execution of a surrogate code group created by the modifying program (20).

25 Claims, 5 Drawing Sheets

DYNAMIC INSTRUCTION MODIFYING CONTROLLER AND OPERATION METHOD

FIELD OF THE INVENTION

The present invention relates generally to computer technology, and more particularly, to program execution control.

BACKGROUND OF THE INVENTION

Computer programmers and computer users always desire to have quick and efficient flexibility, control, and data gathering ability of commercial software, internally or personally developed software packages, and other forms of computer code. To achieve flexibility and control of software, computer programmers and users have proliferated the use of compiler options in computer code for altering a computer program, computer hardware exceptions and break points, and software simulations. All of these techniques are used to give a programmer and/or a user flexibility during program execution, the ability to control program results and flow, and the ability to gain knowledge of the software and the software's execution.

The most primitive way to alter a computer program is to edit the computer program, make all modifications desired by changing instructions in the computer program, compile, link, and execute the code to observe changes. If the changes were not satisfactory, the edit, modify, compile, link, and execute process would have to be performed again. This method has several disadvantages including, being time consuming, not being user-friendly, and not being flexible in any manner.

Compiler options are statements or commands which alter the course of the compilation process such as to determine optimization levels and enable debugging modes or facilities, and/or gather statistical information. By changing, deleting, or adding compiler options, a user or a programmer can alter the performance, execution flow, or results of a computer program. Compiler options are widely used because they are, in most cases, easier to implement than other technologies. Once program execution has been suspended or stopped completely, the user or programmer must edit the computer program, change the compiler options, compile, link, and start the program execution all over again. For programs that require several changes or iterations, when optimizing a program for example, this task of changing compiler options and re-executing is very time consuming, not user friendly, and not very flexible.

Exceptions, or interrupts, and break points are an improvement over other existing technologies due to the fact that exceptions and break points can provide for easier use. Exceptions and break points can be set flexibly and can alter program flow and results without extensive intervention by the user or the programmer. Exceptions and break points allowed users and programmers to benefit from software packages such as program debuggers and the like. Debuggers and other similar software packages usually rely heavily on exceptions and/or break points to function. One disadvantage with exceptions and break points is that they require a large amount of hardware or software overhead in terms of space and time. Due to an exception or break point, memory mapping can change, the computer or microprocessor has to suddenly store or move several pieces of information, sometimes program flow or data computations are lost as a result of an exception or break point, and recovering from an exception back to normal program execution may not be trivial.

To achieve more flexibility and control, simulations of software became widely used. By simulating a device or software package a user or programmer could have full control over all data, execution, and performance evaluation of the software or design under simulation. The biggest disadvantage of simulations is that simulations are extremely slow and time consuming. Some simulations have run times that are one hundred times slower than the amount of time it would take to run the simulated design or program alone without the overhead of the simulation.

All of the above mentioned forms of conventional control of "canned" commercial software and other forms of computer programs have typically: (1) involved time consuming procedures; (2) resulted in a large amount of hardware and/or software overhead; (3) not been dynamic or open-ended functional, especially during program run time; (4) not been user friendly; (5) not been capable of large scale data analysis, or data collection that can interface to other software packages; (6) they produce code that is not optimized or compatible with standard production and/or (7) not been flexible enough for use in a wide range of applications.

SUMMARY OF THE INVENTION

The previously mentioned needs are fulfilled and other advantages achieved with the present invention. In one form, the present invention comprises a controller for use with a general purpose digital computer. The controller comprises a memory system. An execution device is coupled to the memory system. The execution device is directed by a control program which resides in the memory system. A target program is residing in the memory system for execution by the execution device. A dynamic instruction modifying program is residing in the memory system. The dynamic instruction modifying program analyses and alters the target program when the target program is being executed or being prepared for direct execution by the execution device. The analysis and alteration is used to modify the execution of the target program to include direct execution of a surrogate code group created by the dynamic instruction modifying program.

The present invention will be understood by one skilled in the art from the detailed description below in conjunction with the accompanying drawings.

DESCRIPTION OF THE PREFERRED EMBODIMENT

Figure 1:
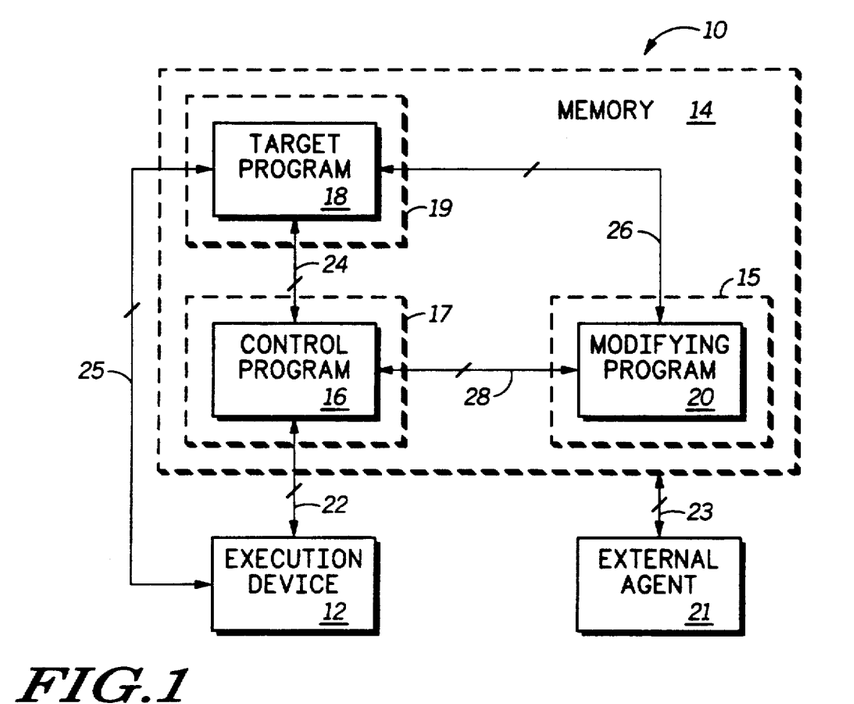
FIG. 1 illustrates, in block diagram form, a dynamic instruction modifying controller in accordance with the present invention.

Illustrated in FIG. 1 is a dynamic software instruction modifying controller 10 that is in accordance with the present invention. Controller 10 has an execution device 12 which can be, for example, a microprocessor, an application specific integrated circuit (ASIC) device, a programmable logic array (PLA), hard-wired logic, an execution unit at least partially software driven by microcode and/or nanocode, a plurality of execution devices, or the like. The execution device 12 functions as a "brain" for the controller. All execution of software, most calculations and order (e.g. system control) is achieved within the controller 10 via hardware under the control of the execution device 12. The execution device 12 allocates resources or controls software to allocate resources, provides integrity for the system, and controls almost all internal and external communication to the controller.

The execution device 12 must have at least partial control over a memory system, referred to as a memory 14, and memory 14 must have at least one computer storage medium. The memory system, referred to as memory 14, can have any of several types of memory, such as dynamic random access memory (DRAM), random access memory (RAM), fast static random access memory (FSRAM), read only memory (ROM), erasable programmable read only memory (EPROM), electrically erasable programmable read only memory (EEPROM), peripheral memory, and the like. For example, in FIG. 1, a first portion of the memory system, referred to as memory portion 17 within memory 14, could be an FSRAM. A second portion of the memory system, referred to as a memory portion 19 within memory 14, could be a RAM. A third portion of the memory system, referred to as a memory portion 15 within memory 14, could be a DRAM. Other portions of memory 14 could be memory-mapped devices, peripherals (e.g. disk drives, tape drives, printers, input/output (I/O) ports, modem lines), or the like. Memory-mapped devices are devices that can be accessed through memory 14 reads and/or stores. Memory 14 also is used to store data and computer programs for controller 10.

The memory 14 contains a control program 16. The control program 16 helps the execution device to control the controller 10. Control program 16 can be as simple as a single instruction. The control program 16 can also be millions of lines of code and perform complex tasks for the execution device 12. Some possible tasks for control program 16 are: (1) peripheral allocation and control; (2) scheduling time sharing for execution device 12; (3) providing memory management; (4) providing maintenance facilities such as memory garbage collection; (5) loading and controlling other programs; (6) keeping track of execution device 12 priorities, and other useful features. When a control program 16 has many features and becomes complex, the control program 16 is usually referred to as an operating system. Control program 16 is connected to the execution device 12 via a bidirectional conductor 22. The conductor 22 and other most other communication conductor links usually have a data bus, an address bus, and control signals, and can carry software parameters, software code, data, and other information.

A target program 18 resides in memory 14 of controller 10. In most cases, the target program 18 is loaded into memory 14 by the control program 16 or the execution device 12. In addition, the target program 18 may reside in memory, for example in ROM, EPROM, or EEPROM, or be placed in RAM by another controller or an external agent 21. External agent 21 is a computer, a microprocessor, or an execution device other than execution device 12 that can exert control over controller 10 and data collected by controller 10. External agent 21 can be executing separate and distinct programs from the controller 10 or can be operating in the same memory system and therefore executing the same programs stored by memory 14. External agent 21 has at least partial read and/or write access to memory 14 through a conductor 23. Direct memory access (DMA) or other similar methods can be used by external agent 21 to place programs into memory 14 with little or no participation by control program 16 or execution device 12. External agents similar to external agent 21 are used often in network systems and in multiprocessor systems. External agents 21 are used to perform system functions, such as data accesses and program memory allocation and loading, so that primary execution devices, such as execution device 12, are more available for the important task of program execution.

The target program 18 is a program that a computer user or computer programmer wants to execute using the controller. The target program 18 could be a computer application (e.g. a spreadsheet, a word processor, a virus detection program, a disk drive copy program and countless more programs), a user-developed or programmer-developed program undergoing modifications, the control program 16 itself, or any program that the user or programmer would want to execute, modify, gain information on, improve the performance of, analyze, or the like. The target program 18 and control program 16 can communicate and exert control over each other via a bidirectional conductor 24. Target program 18 usually communicates to control program 16 for I/O functions, memory accesses, data reception and transmission and other operations. Control program 16 communicates to target program 18 to grant target program 18 access to execution device 12, provide memory management, and pass data. The execution device 12 has direct execution access to the target program 18 via a conductor 25.

A dynamic instruction modifying program 20 resides in memory 14. Modifying program 20 can be placed into memory or reside in memory 14 in a manner similar to that described above for target program 18. Activation or execution of modifying program 20 occurs when target program 18 is activated, and the activation of modifying program 20 is optional. If the execution device 12 or the control program 16 has been informed, through the use of a user defined flag or variable value (not illustrated) in memory 14, to activate modifying program 20, then modifying program 20 is invoked or activated when the target program 18 is activated. If the execution device 12 or the control program 16 were not informed to activate the modifying program 20, modifying program 20 is then not executed and the target program 18 runs without the modifying program 20 interfering.

Assume that the modifying program 20 is activated with the target program 18. Modifying program 20 then communicates with control program 16 and execution device 12 via a bidirectional conductor 28 in a similar manner to that described for target program 18. Modifying program 20 can now modify, monitor, enhance, limit, or collect data from target program 18 via conductor 26 in a direct and dynamic manner that will be described in connection with a subsequent figure.

Figure 2:
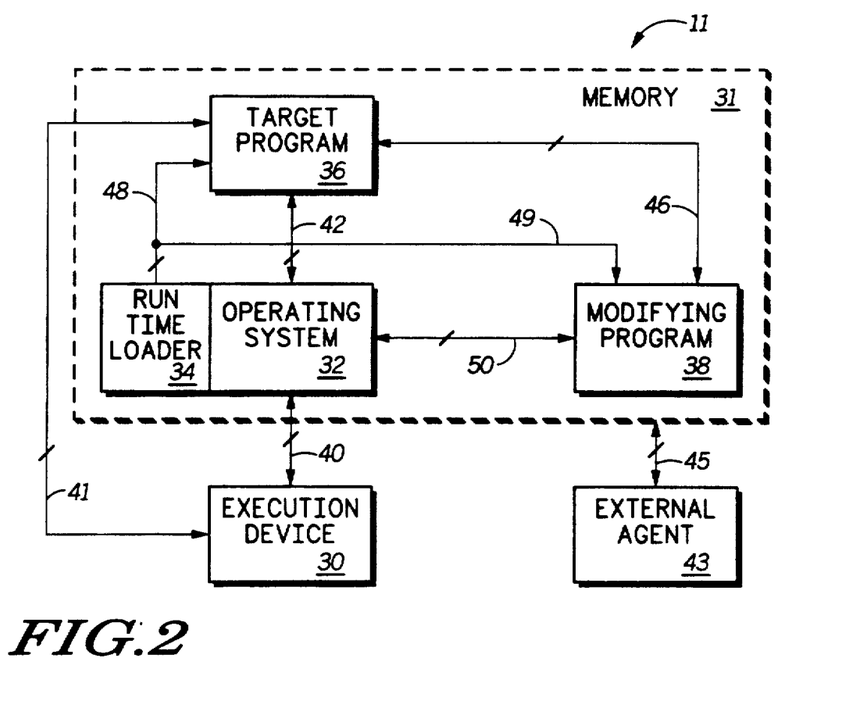
FIG. 2 illustrates, in block diagram form, another embodiment of the dynamic instruction modifying controller in accordance with the present invention.

FIG. 2 illustrates a dynamic instruction modifying controller referred to as a controller 11. Controller 11 is similar to controller 10 except that an operating system previously described for the control program 16 of FIG. 1 is illustrated in more detail. Due to the similarity between FIG. 1 and FIG. 2 the explanation of some parts of FIG. 2 will be brief.

Controller 11 has an execution device 30 and a memory 31 similar to that of controller 10. The execution device 30 communicates with an operating system 32 via a bidirectional conductor 40 similar to controller 10. The operating system 32 communicates with a target program 36 via a bidirectional conductor 42. The target program 36 and the execution device 30 communicate with each other via a conductor 41. The conductor 42 and the target program 36 are each similar to analogous elements of controller 10. A modifying program 38 functions in a manner similar to the modifying program 20 of controller 10. The operating system 32 is illustrated with bidirectional conductors 42 and 50 which are respectively connected to target program 36 and modifying program 38 for communication. Conductors 42 and 50 are used for passing of data, I/O functions and the like. A part of the operating system 32 is a run time loader 34. The run time loader 34 is responsible for loading programs, such as the target program 36 and the modifying program 38, and prepares them for execution by the execution device 30. This loading and preparing function of the run time loader 34 is performed via conductors 48 and 49.

A user or other agent, such as a data file (not illustrated) stored in memory 14, informs the operating system 32 via a user or agent requests, such as a data stream, that when any target program 36 or a particular target program 36 is activated that the modifying program 38 is to be activated as well. The operating system informs the loader of the conditions upon which the modifying program 38 is to be activated. The user or other agent then informs the operating system 32 that the target program 36 is to be activated. The operating system 32 indicates to the run time loader 34 that a target program 36 is to be activated or executed. The run time loader 34 loads from storage (not illustrated) the target program 36 and prepares the target program 36 for execution. The run time loader 34 determines if the modifying program 38 is to be activated for the target program 36. If so, the modifying program 38 is loaded from storage and prepared for execution. Control is then turned over to the modifying program 38 and the target program 36 is modified, monitored, enhanced, limited, or probed for data directly and dynamically before and during execution of target program 36. Data and program code is exchanged between the modifying program 38 and the target program 36 via a bidirectional conductor 46.

Referring back to FIG. 1 and controller 10, once modifying program 20 is activated it can receive information on how to modify the target program 18. This information can be received in two manners. The first manner being that the modifying program 20 can load the information from memory 14, a peripheral (not illustrated), or receive the information interactively from the user. This information (not illustrated) allows the modifying program 20 to correctly modify, monitor, enhance, limit, or collect data from target program 18 when modifying program 20 is activated. The second manner being that the modifying program 20 could be programmed by the user before the target program 18 is activated.

Figure 3A:
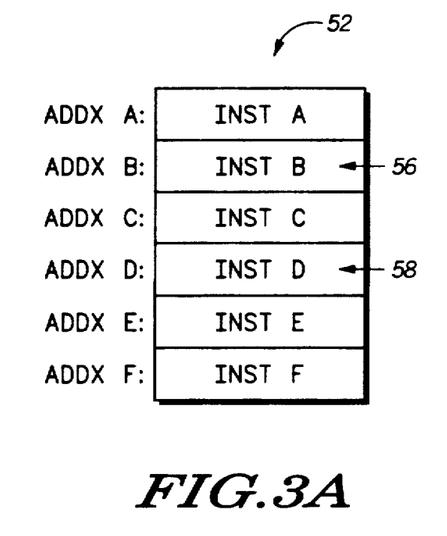
FIGS. 3A-3C respectively illustrate, in tabular form, a target program code segment, a surrogate code group segment, and a program execution flow in accordance with the present invention.
Figure 3B:
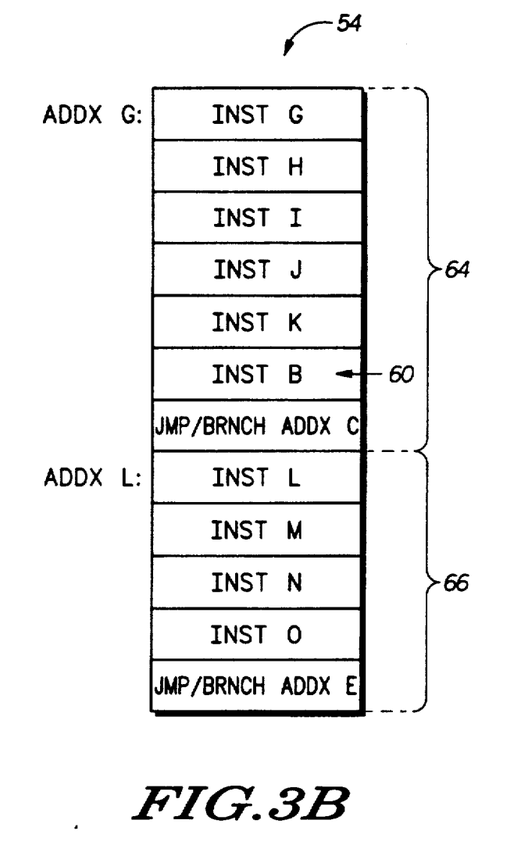
Figure 3C:
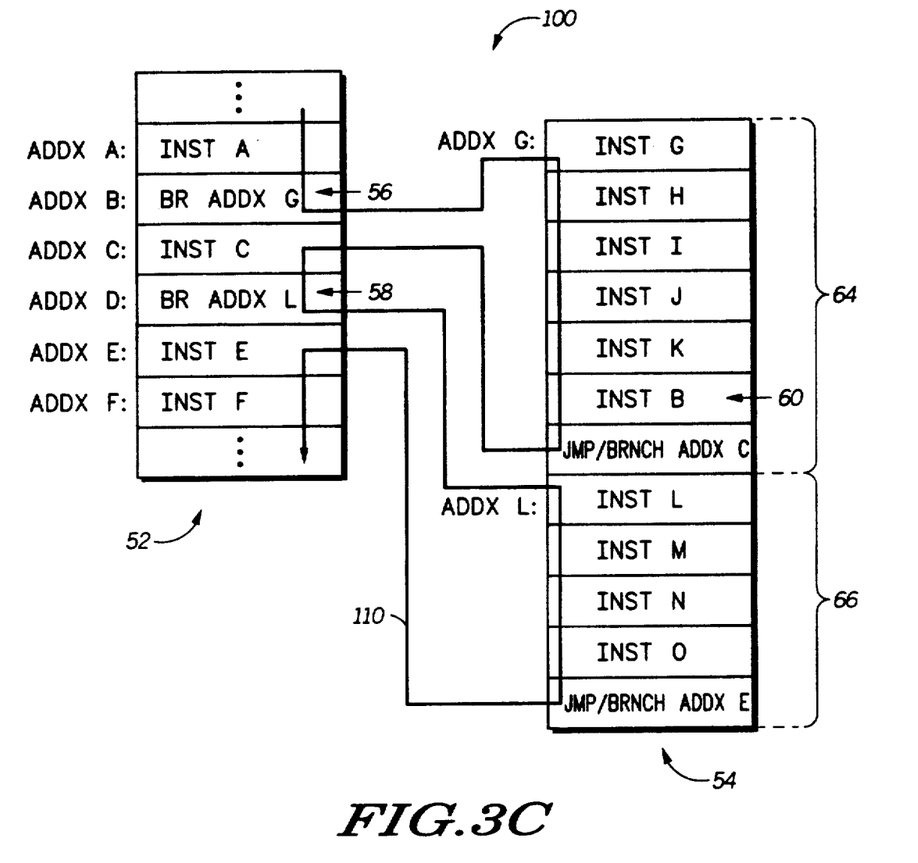

Modifying program 20 uses this information to scan target program 18 while target program 18 is either being prepared for execution, starting execution, or being executed. The scanning mechanism used to alter the target program 18 is illustrated in FIGS. 3A-3C. FIG. 3A illustrates a portion of target program 18 of FIG. 1. The portion of the target program illustrated is referred to as a program 52. Program 52 has six instructions or computer commands respectively labeled as "INST A" through "INST F". Each of these instructions start at a physical memory address respectively referred to as "ADDX A" through "ADDX F". The modifying program 20 of FIG. 1 has been instructed to modify, monitor, enhance, limit, or collect data from the instructions labeled "INST B" and "INST D" in the program 52. "INST B" and "INST D" are respectively referred to as instructions 56 and 58. Although only two instructions, referred to as instructions 56 and 58, are selected in program 52 for alteration, there is no limit to the number of instructions that can be altered. There is also no limit to the number of occurrences of an instruction that can be altered. For example, if seven instructions were selected for alteration and each instruction occurred ten times, all ten occurrences of all seven instructions could be altered.

The modifying program 20 creates a surrogate code group 54 while scanning target program 18 instructions. The surrogate code group 54, illustrated in FIG. 3B, is created based on input data from the user, a memory device, or a peripheral data stream or data file. The surrogate code group 54 contains all instructions that the user intends to use to directly or indirectly (through subroutine calls or system calls) modify, monitor, enhance, limit, or collect data from the instructions 56 and 58 of FIG. 3A. A code section 64 is used to modify instruction 56 and a code section 66 is used to modify instruction 58.

The modifying program 20 scans program 52 to find occurrences of "INST B" and all other instructions that the user wants to modify. Once these instructions are found, the surrogate code group 54 is formed one code section at a time until all the program 52 instructions have been scanned. For example, once instruction "INST B", illustrated in FIG. 3A as instruction 56, is found, instruction 56 is replaced with a branch or a jump instruction to an address labeled "ADDX G" in the newly-created code section 64 of FIG. 3B. The modifying program 20, based on user input or input data, then places a return address jump or branch instruction into an ending instruction of code section 64. This return address is illustrated in FIG. 3B as the last instruction of the code section 64 and labeled "JMP/BRNCH ADDXC". In this case, the instruction directly following the newly altered instruction 56 is instruction "INST C". Therefore a jump of branch to the address "ADDX C" of the instruction "INST C" is placed at the end of code section 64 to ensure that the surrogate code group 54 properly returns execution to the target program 18 of FIG. 1.

The process of creating user-defined replacement surrogate code, scanning, and adding jumps or branches to return or alter execution flow is repeated for every occurrence of every instruction that needs to be modified in the target program 18. For example, instruction 58 is replaced with a jump or a branch to the beginning of code section 66, which is "ADDXL". Code section 66 is created by the modifying program 20 in a similar manner to code section 64. The instruction "JMP/BRNCH ADDX E" is added to the end of code section 66 to ensure that the surrogate code group 54 returns to the target code 18 after surrogate replacement code is executed. It is important to note that every instruction does not always need a separate surrogate code routine or a separate plurality of surrogate instructions. Several instructions could jump or branch to an identical portion of the surrogate code group 54. The use of a single surrogate code portion to replace several instructions is desirable in terms of memory savings and time savings when creating the surrogate code group 54.

Because of the instruction changes and additions mentioned above, when the program 52 is executing, it executes as illustrated in FIG. 3C. FIG. 3C illustrates a program 100 which contains the programs and instructions of both FIG. 3A and FIG. 3B after all modifications by the modifying program 20 have been completed. Branch or jump instructions are illustrated by the abbreviation "BR" due to the fact that branches are more efficient and therefore more desirable. An arrow-terminated line 110 in FIG. 3C illustrates an example program execution flow. Due to the nature of loops, jumps, and branches in computer programs, execution of code is not always sequential and linear. A sequential scheme is depicted in FIG. 3C for simplicity. In the following explanation of FIG. 3C, reference may be made to FIG. 1 and FIGS. 3A–3C.

Execution of program 100 is performed as follows. "INST A" of FIG. 3A is executed and the execution device prepares to execute the instruction at address "ADDX B". The "INST B" or instruction 56 was previously changed by the modifying program 20 to a jump or branch instruction to route execution of target program 18 to "ADDX G" as depicted in FIG. 3C. Because of this replacement, execution of program 52, which represents a portion of target program 18, is altered and execution continues at "ADDX G" by executing "INST G". The instructions of code section 64 are then executed in some logical order performing extra features, such as, manipulating data for the program 52, changing the performance of program 52, triggering hardware or software functions, and countless other possibilities. Due to the fact that instruction 56 was replaced by a jump or a branch instruction, instruction 56 must be duplicated near the end of code section 64 if the user or agent does not want to alter the results of the target program 18. If the user informed the modifying program 20 that the target program 18 results were not to be altered, the modifying code duplicates the replaced instruction "INST B" of instruction 56 of FIG. 3A into code section 64 as illustrated by instruction 60 in FIG. 3B and FIG. 3C. The modifying program 20 can perform this duplicating function easily if programmed to do so. Once "INST G" down to "INST B" (instruction 60) in code section 64 have been executed, the "JMP/BRNCH ADDX C" of FIG. 3C returns execution back to the target program 18 at instruction "INST C". The target program 18, illustrated in part by program 52, has therefore been dynamically and directly modified, monitored, enhanced, limited, or been characterized by the modifying program 20 and the surrogate code group 54 with little overhead.

The instruction "INST C" is executed by the execution device 12 of FIG. 1 and "INST D", or instruction 58, becomes the next instruction to be executed. The instruction 58 was replaced by the modifying code 20 and now contains a jump or branch to "ADDX L" in the code section 66 of surrogate code 54 as illustrated in FIG. 3C. The code "INST L" through "INST O" are executed and the final instruction "JMP/BRNCH ADDX E" of FIG. 3C returns control to program 52 at the next logical executable instruction "INST E". In the case of code section 66, the replaced instruction "INST D" of program 52 was not placed into the code section 66. In this case the user intended to modify in some way the calculations of program 52 or alter the algorithms used to calculate results in the program 52.

The target program 18, or program 52, has been altered in a manner that allows for: (1) very time efficient procedures and faster resulting execution of code than other methods; (2) a minimal amount of hardware and/or software overhead; (3) very dynamic and open-ended functionality, even during program run time; (4) a user friendly and interactive solution to run-time code modification which is a big advantage over known methods; (5) large scale data analysis, or data collection that can optionally interface to other software packages; (6) the elimination of exceptions; and (7) a high amount of flexibility.

Figure 4A:
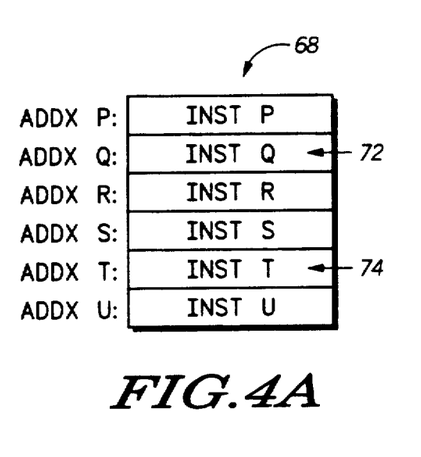
FIGS. 4A-4B respectively illustrates, in tabular form, another form of a target program code segment and a surrogate code group segment in accordance with the present invention.

FIG. 4A illustrates a portion of the target program 18, referred to as program 68, which contains "INST P" through "INST U" at respective addresses "ADDX P" through "ADDX U". The user has informed the modifying program 20 that some instructions, specifically "INST Q" and "INST T", are to be removed from or not executed by the target program 18. The modifying program 20 creates the surrogate code group 70 of FIG. 4B. The instruction 76 is a jump or branch to "INST R" of FIG. 4A. The instruction 78 is a jump or a branch to "INST U" of FIG. 4A. The instruction 72 and 74 of FIG. 4A are instructions in the target program 18 that the user wanted removed. The instruction 72 is replaced with a jump or a branch to instruction 76 or address "ADDX X" of FIG. 4B. The instruction 74 is replaced with a jump or a branch to instruction 78 or address "ADDX Y" of FIG. 4B. The instructions 72 and 74 are now removed from the target program 18.

If the modifying program 20 was made a little more intelligent and informed not to follow the rule of always replacing a target program 18 instruction with a jump or branch and instead was informed to optimize, the modifying program 20 could be more efficient. For example, the code of FIG. 4B would not need to be created for the example of FIG. 4A–4B. The instructions 72 and 74 of FIG. 4A could be replaced with one or more of an instruction known as the "no operation" or NOP. This replacement would remove instructions 72 and 74 from the target program 18 in a very time and space efficient manner. In the same manner, if the instructions 72 and 74 were to be replaced by only one instruction, that instruction could, in some cases, occupy the same physical space as instructions 72 and 74 in the target code 18. The surrogate code group 70 of FIG. 4B would be nonexistent for the NOP case discussed above and the case of a one instruction replacement. By eliminating the need for surrogate code group 70, which is already very space and time efficient, the modifying program 20 becomes even more efficient by removing two branch or jump instructions from the execution of the target program 18. The jump or branch of instruction 72 of FIG. 4A to address "ADDXX" is not needed, and the jump or branch of instruction 76 of FIG. 4B to the target program 18 is not needed.

Figure 5:
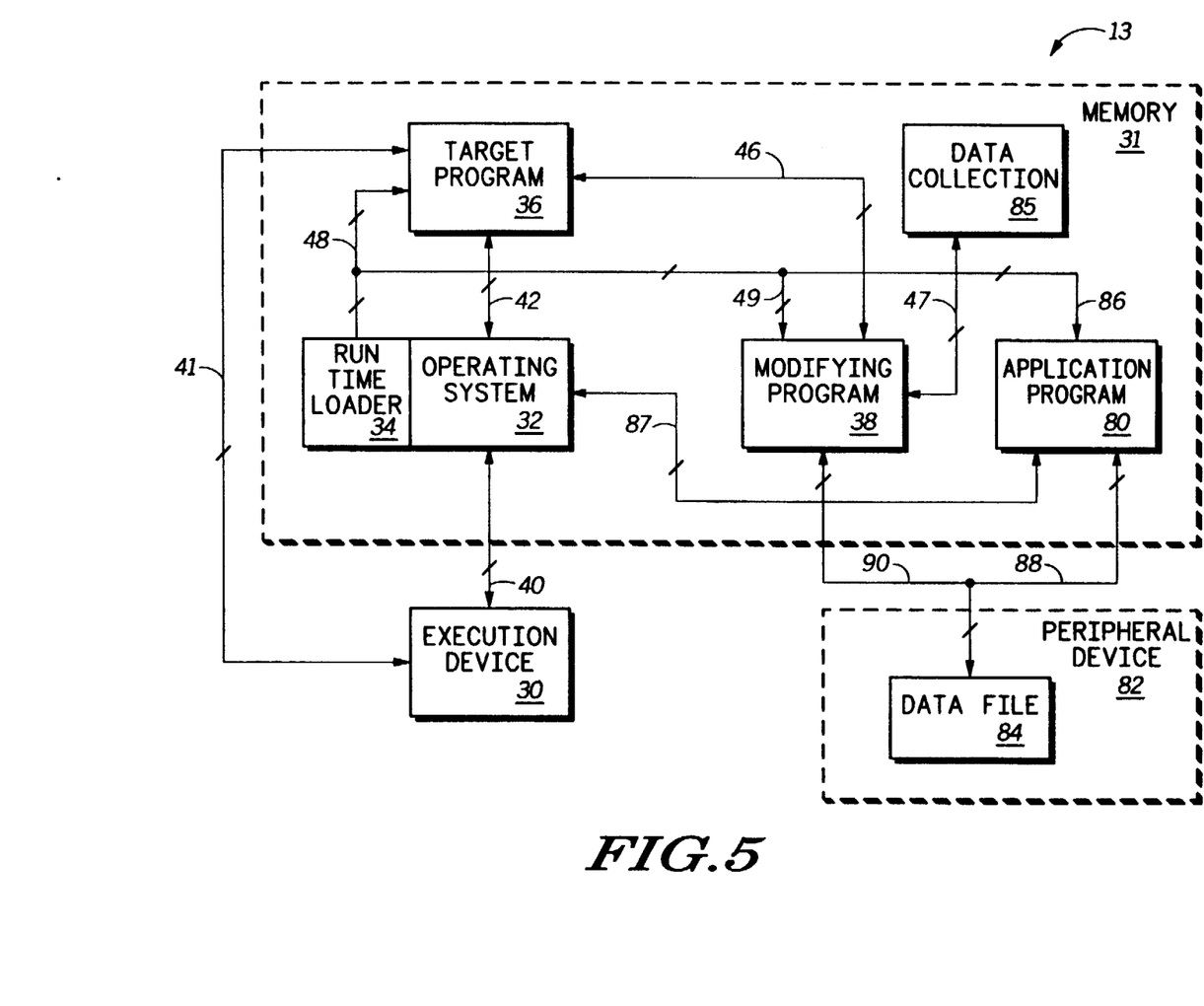
FIG. 5 illustrates, in block diagram form, yet another form of the dynamic instruction modifying controller in accordance with the present invention.

Illustrated in FIG. 5 is a controller similar to that of FIG. 2. Because FIG. 2 and FIG. 5 are very similar, portions of controller 13 of FIG. 5 are labelled identically to controller 11 of FIG. 2. Controller 13 illustrates that a modifying program 38 can write data out to an external data collection, referred to as data file 84, or to an alterable portion of memory 31. The data file 84 can contain any amount of information about a target program 36. It may be difficult for a user to inform or program the modifying program 38 to do a large amount of analysis on target program 36 data. In addition, it would be a waste of time for a user to program the modifying program 38 to act as a spreadsheet, statistical analyzer, or the like, when powerful commercial software packages that perform many analysis tasks are available.

In a case where the user wants to do a large amount of analysis, the modifying program 38 can write a data file 84 to a peripheral device 82. Another option is that the modifying program could write a data collection 85 in memory 31. Due to the fact that the data collection 85, the data file 84, and their respective interconnections are conceptually similar, only the data file 84 will be explained in detail. The peripheral device 82 can be a tape drive, a disk drive, another computer, and many other types of storage devices. Reads and writes to the data file 84 from the modifying program 38 and surrogate code group (usually created as a part of the modifying program 38) are made via a bidirectional conductor 90. A conductor 47 that connects modifying program 38 and data collection 85 functions similar to conductor 90.

The user can inform an operating system 32 to load an application program 80 such as a spreadsheet, statistical analyzer, or the like. The operating system 32 informs a run time loader 34 to load the application program 80 into memory 31 and prepare it for execution. Bidirectional conductors 86 and 87 are used by the application program 80, the operating system 32, and the run time loader 34 to communicate data and perform functions such as I/O and memory access. Once the application program 80 is in memory 31 and executing via the execution device 30, the user can use the application program 80 to analyze the data file 84 in any manner the application program 80 allows. A bidirectional conductor 88 illustrates the analysis link between the application program 80 and the data file 84. The data collection 85 in memory can be analyzed by the application program 80 in a similar manner although connections to perform this analysis are not specifically illustrated and emphasized.

Figure 4B:
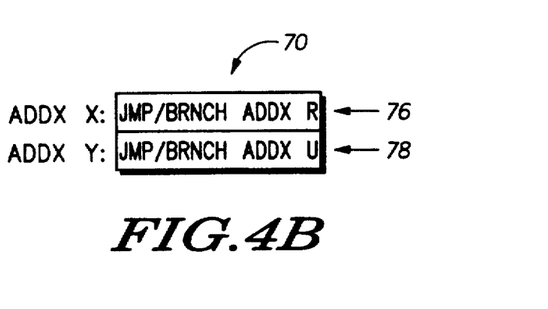
Figure 6:
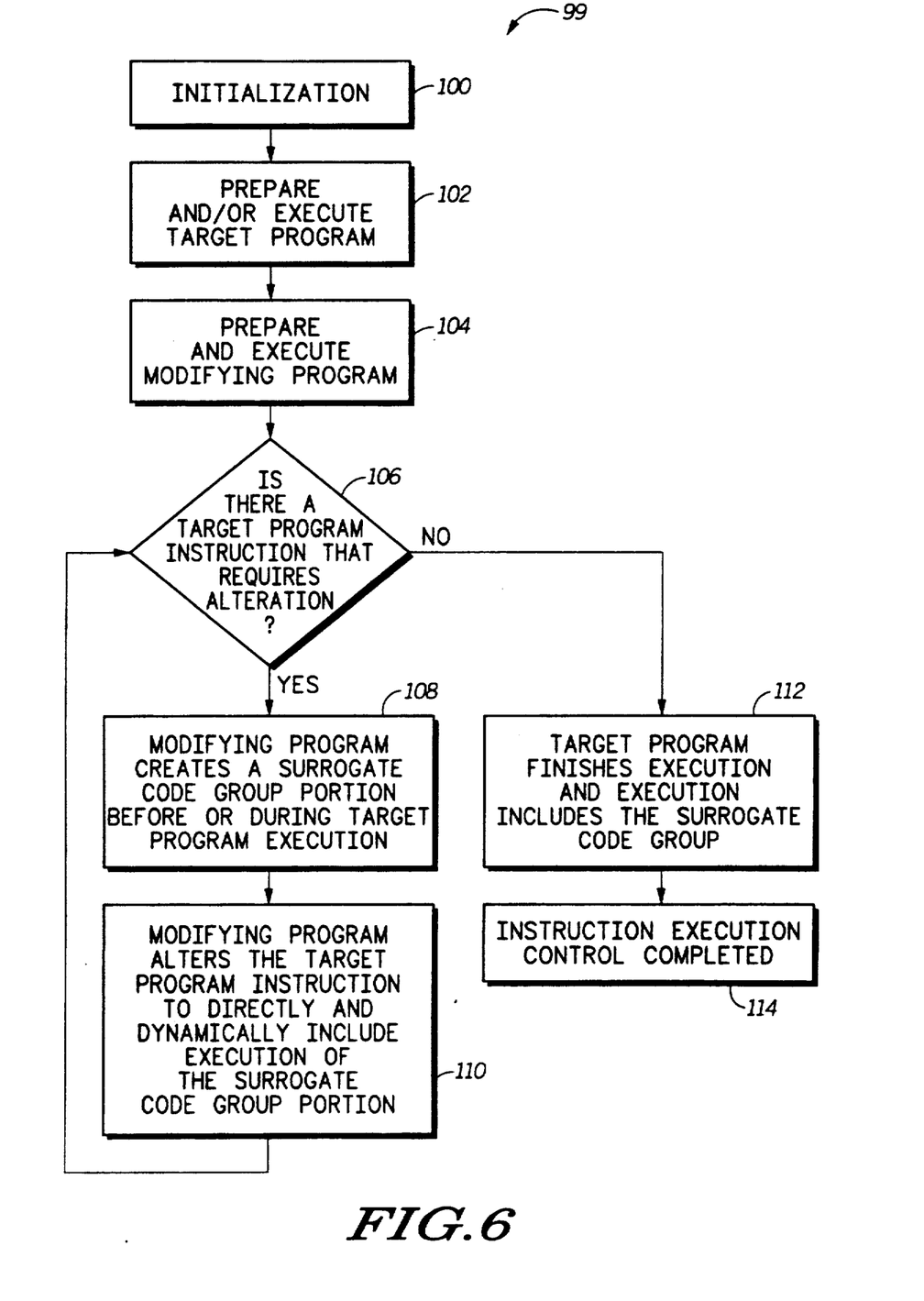
FIG. 6 illustrates, in flowchart form, a method of dynamic instruction modification.

FIG. 6 illustrates, in flowchart form, the method of dynamic, direct instruction modification described herein for FIGS. 3-4. FIG. 6 illustrates a method 99. Method 99 starts with an initialization step 100. The initialization step 100 represents all the steps needed to prepare the system for execution, such as loading software into memory, programming software such as the modifying program, setting up the operating system properly, connecting all needed hardware for the target program. In many cases all the initialization will be completed by the hardware or software before the user is ready to execute the target program. In some cases all the set up can be done by the operating system or the execution device without user participation.

Once initialization is complete, step 102 illustrates that the target program is either prepared for execution or starts execution within the controller. The modifying program is then executed in step 104 and the modifying program begins to scan the target program. The scanning procedure is illustrated by steps 106, 108, and 110. In step 106, the modifying program scans the target program to find an instruction in the target program that requires modification, alteration, or the like. Once the modifying program finds a target program instruction that it has been programmed to modify, the modifying program, illustrated in step 108, creates a surrogate code group portion to replace the target program instruction. This surrogate code group portion is included in the target program execution flow through the use of branch or jump instructions and replaces, alters, modifies, monitors, or limits the target program instruction found in step 106. This target program alteration is described in step 110.

Steps 106, 108, and 110 are performed until all the target program instructions that require alteration are processed. Once all of the instructions in the target program are scanned or processed, an entire surrogate code group is complete. The entire surrogate code group is executed as a part of the target program until the target program completes execution as illustrated in step 112. Step 114 indicates that the surrogate code and the target program have finished executing. Data analysis, data collection, and other tasks can be performed in numerous ways.

Due to the flexibility of the inventive method, the controller and method described for FIGS. 1–5 can be used in several applications and can perform several useful functions. Some of those functions are described below.

The method and controller described herein can be used to create and function as a debugger. The user can direct the modifying program to single step execute the target program and set breakpoints into the target program. Single step means that the modifying program creates new surrogate code for each instruction while the target program is executing. This new code can display or print the results of operations, operands, addresses, operators, state of the execution device, register values, values stored in memory, and other popular debugger features. Because exceptions are avoided in this method and the flexibility and user interaction is greater than known debugging techniques, a debugger using the methods of FIG. 3 and FIG. 4 would be superior.

The method and controller described herein can be used to create a surrogate code group to trip or synchronize hardware, called hardware triggering, or to trigger software events. The user can inform the modifying code that certain instructions in a target program are to be altered. The user also programs the modifying program with replacement instructions for the target program instructions that need modifications. The surrogate code created from the user information and input instructions by the modifying code can trigger or synchronize external or internal hardware or software packages based on the events that occur in the target program.

The method and controller described herein can be used to troubleshoot software interfaces controlling hardware devices or any other software accessible interface. For example, the user is having trouble getting a disk drive to read or write data. The user can create a program to read a portion of the disk or the user can use a "canned" commercially available program that accesses the disk drive. This program then becomes the target program. The user then informs the modifying program to intercept the execution of all disk data reads and writes. The user also informs the modifying code of what to do in place of the disk data reads and writes or how to monitor the disk data reads and writes. The modifying code then creates a surrogate code group to intercept the disk data reads and writes and analyze the disk drive performance in the manner the user intended. The user may be able to determine the software or hardware disk drive problem from the data intercepted by the modifying program and the surrogate code group.

The method and controller described herein can also be used to aid in the design of hardware and software. For example, a memory cache needs to be optimized for an application program running in a specific environment. The modifying code and surrogate code technique can monitor the application program when it is running to collect data on memory reads and writes. This data can then be written to a data file by the surrogate code and/or the modifying program. That data file can then be used by memory cache analysis packages to design a memory cache best fitted for the memory reads and writes of the application program.

The method and controller described herein can also be used to collect run-time performance data of a target program. The surrogate code can count the number of occurrences of an address, an operand, or a specific instruction. The surrogate code can keep track of the time between certain events through the use of counters or timers. The surrogate code can modify run-time performance by being interactive with the user and having the user change parameters. For example, if a multiply is taking too long, the user might replace the multiply with a different algorithm to observe performance changes.

Software compatibility has been an important topic and a problem for many microprocessor manufacturers and software companies. A dynamic instruction modifying controller can be the solution to some of these concerns. Suppose, for example, that a user buys a software package A from a software company B. The software package A is a software package compatible with a specific microprocessor or specific computer referred to as execution device C. The user has used software package A on execution device C for many years. Now, the user wants to upgrade his execution device C to a new or different execution device D and would like to keep all of the data and options that accumulated with the software package A. The software package A is not compatible with the new or improved execution device D that the user wants to purchase. A dynamic instruction modifying controller and method of operation as illustrated in FIGS. 1-5 can be used to dynamically and directly replace all incompatible code in the software package A to be compatible to the execution device D at run time. Therefore, the software company B can write one version of software and make this version run on many different types of execution devices by using the inventive methods and controllers described herein.

This option is much better than having software company B rewrite new versions of code for every upgraded or incompatible execution device. This method also allows users more flexibility over what software packages they can purchase. It also allows the user more flexibility when deciding what type of execution device to purchase.

While the present invention has been illustrated and described with reference to specific embodiments, further modifications and improvements will occur to those skilled in the art. For example, many other applications, such as virus detectors, security software, run-time code optimization software, customized hardware interfacing software and other useful software can be designed that use a dynamic instruction controller method and system. The control program can exist in several forms and have many different features and still serve the same basic function of control for the controller. The execution device can be a either plurality of devices, a workstation, a supercomputer, a microprocessor, or the like. The user interface for the modifying program can vary considerably. Data sent to the data collection or data file can in some cases be transmitted or relayed to another computing system or receiving agent. It is to be understood, therefore, that this invention is not limited to the particular forms illustrated and that it is intended in the appended claims to cover all modifications that do not depart from the spirit and scope of this invention.

What is claimed is:

1. A controller for use with a digital computer, the controller comprising:

an execution device; and a memory system coupled to the execution device, the memory system comprising:

a control program residing in a first portion of the memory system for directing operation of the execution device;

a target program residing in a second portion of the memory system for execution by the execution device, the target program containing computer instructions which, when executed by the execution device, execute in a predetermined sequential execution flow through the execution device to perform at least one predetermined operation; and a dynamic instruction modifying program residing in a third portion of the memory system, the dynamic instruction modifying program analyzing and altering at least one computer instruction within the target program before the at least one instruction is executed by the execution device, the altering of the at least one computer instruction within the target program dynamically changing the execution flow of the target program within the execution device, the changing in the execution flow allowing the execution device to execute additional instructions not originally intended to be executed during the execution of the target program.

2. The controller of claim 1 wherein a surrogate code group is created by the dynamic instruction modifying program, the surrogate code group being inserted into the target program to alter the execution flow of the target program to perform functions which originally were not intended to be performed by the target program.

3. The controller of claim 2 further comprising an alterable memory having a means for data collection created by execution of the dynamic instruction modifying program, the means for data collection containing information about the target program.

4. The controller of claim 3 wherein a plurality of instructions residing in the memory system analyzes the means for data collection after completion of execution of the target program by the execution device.

5. The controller of claim 1 wherein the control program is an operating system of the digital computer.

6. The controller of claim 1 wherein the execution device is at least one microprocessor.

7. The controller of claim 1 wherein the target program resides in an alterable memory portion of the memory system and the operating system resides in a read only portion of the memory system.

8. The controller of claim 1 wherein the target program resides in an alterable memory portion of the memory system and the operating system is placed into an alterable memory portion of the memory system.

9. A controller for use with a digital computer, the controller comprising:
an execution device; and
a memory system coupled to the execution device, the memory system comprising:
a control program residing in a first portion of the memory system for directing operation of the execution device;
a target program residing in a second portion of the memory system for execution by the execution device, the target program containing a predetermined number of computer instructions stored within the memory system for sequential execution by the execution device; and
a dynamic instruction modifying program residing in a third portion of the memory system, the dynamic instruction modifying program analyzing and altering the target program, while the target program is being prepared for execution by the execution device, to include a surrogate code group created by the dynamic instruction modifying program for direct execution by the execution device, the surrogate code group increasing a total number of instructions being executed within the target program to expand the functionality of the target program in a predetermined manner which alters an execution flow of the target program through the execution device;
a peripheral device coupled to the execution device for storing data; and
a means for collecting data from the dynamic instruction modifying program, the means for collecting data gathering information pertaining to the target program and storing the information pertaining to the target program within the peripheral device.

10. The controller of claim 9 wherein the memory system further comprises an application program residing in the memory system for analysis and presentation of data contained in the means for collecting data.

11. A system comprising:
an execution means; and
a memory means, the memory means containing:
a first plurality of binary values stored in the memory means, the first plurality of binary values instructing the execution means to perform a first plurality of operations in response to being accessed and executed by the execution means; and
a second plurality of binary values stored in the memory means wherein the second plurality of binary values is executed before execution of the first plurality of binary values, the second plurality of binary values altering at least one binary value within the first plurality of binary values so that the first plurality of binary values performs a second plurality of operations in response to being accessed and executed by the execution means wherein the second plurality of operations is different from the first plurality of operations.

12. A controller for use with a digital computer, the controller comprising:
an execution device; and
a memory system coupled to the execution device, the memory system comprising:
means for storing and transferring a first plurality of target computer instructions to the execution device for instruction execution, the target computer instructions being computer instructions which when executed by the execution device execute in a predetermined sequential execution flow to perform a predetermined operation with the digital computer; and
means for storing and transferring a second plurality of modifying computer instructions to the execution device for instruction execution, the second plurality of modifying computer instructions analyzing and altering at least one target computer instruction within the first plurality of target computer instructions before the at least one target computer instruction is executed by the execution device, the altering of the at least one target instruction within the first plurality of target computer instructions changing the execution flow of the first plurality of target computer instructions within the execution device, the changing in the execution flow allowing the execution device to execute at least one additional instruction not originally intended to be executed during the execution of the first plurality of target computer instructions.

13. A method for altering the execution flow of an execution device, the execution device having access to means for processing computer instructions and means for storing computer data, the method comprising the steps of:
storing a first plurality of binary values in the means for storing computer data, the first plurality of binary values collectively defining a target program;
storing a second plurality of binary values in the means for storing computer data, the second plurality of binary values collectively defining a modifying program;
directing the execution device to execute the target program by using the means for processing computer instructions;
executing the modifying program with the means for processing computer instructions wherein the modifying program selectively searches through the target program to locate at least one predetermined binary value within the target program;
forming at least one surrogate binary value within the means for storing computer data, the at least one surrogate binary value performing at least one predetermined operation wherein the at least one surrogate binary value will at the time of execution identify a predetermined binary value within the target program as being a computer instruction to be sequentially executed by the means for processing computer instructions after execution of the at least one surrogate binary value;

changing the at least one predetermined binary value within the target program to a computer binary value which when executed by the means for processing computer instructions identifies the at least one surrogate binary value as a next computer instruction which should be sequentially executed by the means for processing computer instructions; and executing the target program with the means for processing computer instructions wherein the at least one surrogate binary value is executed by the means for processing computer instructions as a part of the target program.

14. The method of claim 13 wherein the at least one surrogate binary value comprises a plurality of predetermined computer instructions.

15. The method of claim 14 wherein the last instruction executed in the plurality of predetermined computer instructions is an instruction selected from a group consisting of: a jump instruction and a branch instruction.

16. The method of claim 15 wherein the instruction selected from the group returns the execution flow to an instruction within the target program.

17. The method of claim 13 wherein the step of forming at least one surrogate binary value which will at the time of execution identify a predetermined binary value within the target program further comprises:

identifying a software instruction located directly adjacent the at least one predetermined binary value within the target program as the computer instruction which should be sequentially executed by the means for processing computer instructions after execution of the at least one surrogate binary value.

18. The method of claim 13 wherein the one predetermined binary value within the target program is replaced with an instruction selected from the group consisting of: a jump instruction and a branch instruction.

19. The method of claim 13 wherein the at least one predetermined binary value within the target program comprises a plurality of predetermined binary values.

20. The method of claim 13 wherein the first plurality of binary values collectively defining a target program is increased in number by the inclusion of the at least one surrogate binary value.

21. A method for altering the execution flow of an execution device, the execution device having access to means for executing computer instructions, means for storing computer data, a target program located within the means for storing computer data, and a modifying program stored within the means for storing computer data, the method comprising the steps of:

directing the execution device to begin sequential transferring computer instructions which are located within the target program to the means for executing computer instructions for execution within the execution device;

sequentially transferring all the computer instructions from the modifying program to the means for executing computer instructions, wherein the computer instructions within the modifying program instruct the means for executing to selectively search through the target program to locate at least one predetermined binary value within the target program;

altering the binary value within the target program to a different binary value which when executed by the means for executing performs a different operation within the execution device than an operation which was to be performed by the binary value within the target program; and executing the target program, wherein the different binary value is executed by the means for executing computer instructions in place of the binary value within the target program.

22. The method of claim 21 wherein the different binary value is a value selected from a group consisting of: a branch instruction, a jump instruction, and a no operation (NOP) instruction.

23. A method for executing a plurality of computer instructions within an execution device, the execution device having access to means for executing computer instructions and a memory means, the method comprising:

informing the execution device that the plurality of computer instructions stored in the memory means is to be executed;

scanning each of the computer instructions within the plurality of computer instructions by executing a set of modifying computer instructions which is not included within the plurality of computer instructions, the scanning being performed before the execution of the plurality of computer instructions to identify selected instructions within the plurality of computer instructions; and replacing each of the selected instructions with at least one replacement computer instruction, the at least one replacement computer instruction performing a first operation, upon execution, which is different from a second operation which was to be performed by at least one of the selected instructions.

24. A method of controlling instruction execution in a digital computer having an execution device for executing a plurality of computer programs including a target program, the digital computer performing a predetermined task when executing the target program, comprising the steps of:

providing a modifying program for execution by the execution device;

creating a surrogate code group for use during execution of the target program by the execution device, the surrogate code group being created by the modifying program; and altering at least one predetermined target instruction in the target code by directly and dynamically routing execution of the target program to at least one surrogate instruction in the surrogate code group, the surrogate code group returning execution control to the target program after execution by the execution device of the at least one surrogate instruction, the at least one surrogate instruction allowing the target program to dynamically change the predetermined task of the digital computer to another task which is different from the predetermined task, the step of altering the at least one target instruction being performed by the modifying program.

25. The method of claim 24 wherein the step of using the execution of the modifying program to alter at least one predetermined target instruction to route the execution of the target program further comprises: replacing the at least one predetermined target instruction with a selected instruction which directs the digital computer to directly include execution of the surrogate code group within the target program, the selected instruction being selected from a group consisting of: a jump instruction, a branch instruction, a plurality of jump instructions, and a plurality of branch instructions.

* * * * *